US009660936B2

(12) United States Patent
Locatelli et al.

(10) Patent No.: US 9,660,936 B2
(45) Date of Patent: May 23, 2017

(54) METHOD AND APPARATUS FOR SUPPORTING REPROGRAMMING OR RECONFIGURING

(71) Applicants: STMicroelectronics (Grenoble 2) SAS, Grenoble (FR); STMicroelectronics S.r.l., Agrate Brianza (IT)

(72) Inventors: Riccardo Locatelli, Fontanil (FR); Michael Soulie, Voiron (FR); Francesco Giotta, S. Gregorio di Catania (IT); Raffaele Guarrasi, Grenoble (FR); Giuseppe Guarnaccia, Francofonte (IT)

(73) Assignees: STMICROELECTRONICS (GRENOBLE 2) SAS, Grenoble (FR); STMICROELECTRONICS S.R.L., Agrate Brianza (IT)

( * ) Notice: Subject to any disclaimer, the term of this patent is extended or adjusted under 35 U.S.C. 154(b) by 47 days.

(21) Appl. No.: 14/516,300

(22) Filed: Oct. 16, 2014

(65) Prior Publication Data

US 2015/0109916 A1    Apr. 23, 2015

(30) Foreign Application Priority Data

Oct. 18, 2013   (GB) .................................. 1318477.5

(51) Int. Cl.
| G06F 17/30 | (2006.01) |
| H04L 12/933 | (2013.01) |
| G06F 15/173 | (2006.01) |
| H04L 12/851 | (2013.01) |

(52) U.S. Cl.
CPC ...... *H04L 49/109* (2013.01); *G06F 15/17312* (2013.01); *H04L 47/24* (2013.01)

(58) Field of Classification Search
None
See application file for complete search history.

(56) References Cited

U.S. PATENT DOCUMENTS

| 6,526,462 B1* | 2/2003 | Elabd ................... G06F 9/5016 710/242 |
| 2007/0061342 A1 | 3/2007 | Magdeburger et al. |
| 2007/0094664 A1 | 4/2007 | So et al. |
| 2010/0005470 A1* | 1/2010 | Simon ..................... G06F 13/28 718/103 |
| 2012/0036509 A1* | 2/2012 | Srinivasan .............. G06F 9/526 718/102 |
| 2012/0098796 A1* | 4/2012 | Lin ....................... G06F 3/0428 345/175 |
| 2013/0061003 A1 | 3/2013 | Millet et al. |

OTHER PUBLICATIONS

GB Search Report, dated Apr. 15, 2014, for GB Application No. 1318477.5, 3 pages.

* cited by examiner

*Primary Examiner* — Anh-Vu Ly
(74) *Attorney, Agent, or Firm* — Seed IP Law Group LLP

(57) ABSTRACT

A method includes setting a first indicator to a first value, which causes an apparatus to stop receiving traffic from a traffic source. At least one register is accessed to read or write at least one new value, and a second indicator is set indicating that accessing of the at least one register has completed. The first indicator is set to a second value. When the first indicator has the second value and the second indicator is set, the apparatus is again allowed to receive traffic from the traffic source.

25 Claims, 5 Drawing Sheets

METHOD AND APPARATUS FOR SUPPORTING REPROGRAMMING OR RECONFIGURING

BACKGROUND

Technical Field

Embodiments relate in particular but not exclusively a method and apparatus supporting reprogramming or reconfiguring of an apparatus.

Description of the Related Art

A network on chip (NoC) uses packet based communication and a layered definition of the communication. Network on chips provide an interconnect between one or more initiators and their respective targets.

Quality of Service mechanisms are provided in order to arbitrate between requests for access to the network on chip.

BRIEF SUMMARY

According to an embodiment, there is provided a method comprising: setting a first indicator to a first value which causes an apparatus to stop receiving traffic from a traffic source; accessing at least one register to read or write at least one new value; setting a second indicator to a first value indicating that accessing of said at least one register is completed; and setting said first indicator to a second value, wherein when said first indicator has the second value and said second indicator has the first value, allowing said apparatus to receive traffic from said traffic source.

At least one of said first and second indicators may comprise a flag.

At least one register may comprise a control register.

The apparatus may comprise a plurality of sets of registers, each set of registers being associated with a service, said method comprising accessing at least one register of at least one set.

The method may comprise polling said second indicator to determine if said accessing of said at least one register is completed.

The setting of said first indicator to said second value may be dependent on a value of one or more further second indicators.

The setting of said first indicator to at least one value may be by a controller.

The controller may comprise a CPU.

A plurality of different first indicators may be provided, one of which is to be set.

When said first indicator has the second value and said second indicator has the first value, all outstanding transactions associated with traffic received prior to said traffic having been stopped may have been completed or flushed from a buffer.

According to an embodiment, one or more of the features of the above described method may be performed on computer aided design tool for providing a design of a circuit.

According to an embodiment, there is provided an apparatus comprising: an input configured to receive traffic from a traffic source; at least one register configured to control said apparatus; and a controller configured to control said apparatus such that setting of a first indicator to a first value is configured to cause said apparatus to stop receiving traffic from said a traffic source, said controller being configured to set a second indicator to a first value indicating that access of at least one of said at least one register to read or write at least one new value is completed, wherein when said first indicator has the second value and said second indicator has the first value, said controller is configured to allow said apparatus to receive traffic from said traffic source.

At least one of said first and second indicators may comprise a flag.

The at least one register may comprises a control register.

The apparatus may comprise a plurality of sets of registers, each set of registers being associated with a service, at least one register of at least one set being accessed.

The apparatus may comprise an interface configured to receive a polling request for said second indicator to determine if said accessing of said at least one register is completed and for providing a response thereto.

The interface may be configured to receive said polling request from a second controller.

The apparatus may comprise an interface configured to receive information dependent on a value of one or more further second indicators, wherein setting of said first indicator to said second value is dependent on said information.

The interface may receive said information dependent on a value of one or more further second indicators from a second controller.

The second controller may comprise a CPU.

A plurality of different first indicators may be available, one of which is to be set.

When said first indicator has the second value and said second indicator has the first value, all outstanding transactions associated with traffic received prior to said traffic having been stopped may have been completed or flushed from a buffer.

A network interface comprising an apparatus as described above may be provided, in some embodiments.

Some embodiment may provide in combination a network interface, a traffic source and interconnect, said network interface having an output configured to output traffic from said traffic source onto said interconnect.

Some embodiment may be provided on an integrated circuit or die.

In the above, many different embodiments have been described. It should be appreciated that further embodiments may be provided by the combination of any two or more of the embodiments described above.

A computer program comprising program code means adapted to perform the method may also be provided. The computer program may be stored and/or otherwise embodied by means of a carrier medium.

Various other aspects and further embodiments are also described in the following detailed description and in the attached claims.

BRIEF DESCRIPTION OF THE SEVERAL VIEWS OF THE DRAWINGS

For a better understanding of some embodiments, reference is now made by way of example only to the accompany drawings. Non-limiting and non-exhaustive embodiments are described with reference to the following drawings, wherein like labels refer to like parts throughout the various views unless otherwise specified. One or more embodiments are described hereinafter with reference to the accompanying drawings in which.

DETAILED DESCRIPTION

Figure 1:
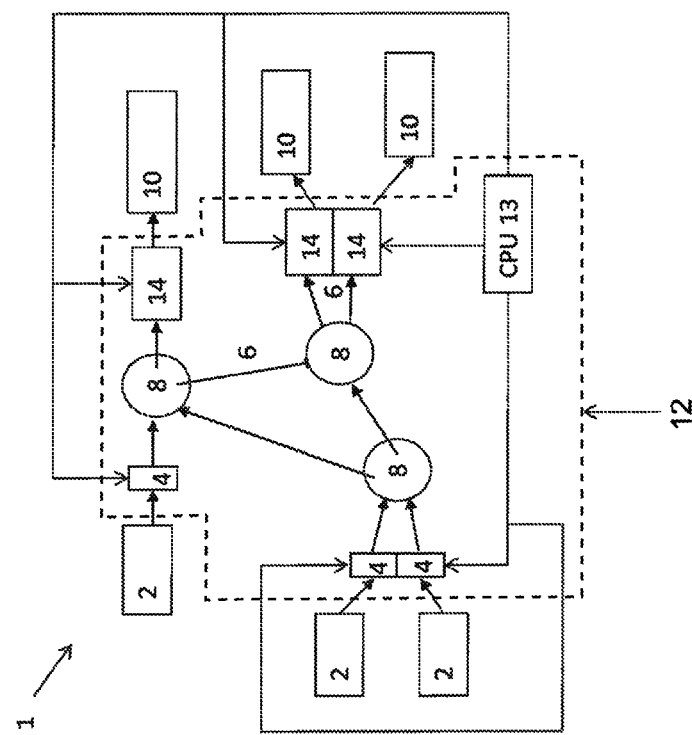
FIG. 1 shows schematically part of an electronics device in which some embodiments may be provided.

Reference is made to FIG. 1 which schematically shows part of an electronics device 1 in which embodiments may be provided. At least part of the device shown in FIG. 1 may be provided in an integrated circuit. In some embodiments, all of the elements shown in FIG. 1 may be provided in an integrated circuit. In alternative embodiments, the arrangement shown in FIG. 1 may be provided by two or more integrated circuits. Some embodiments may be implemented by one or more dies. The one or more dies may be packaged in the same or different packages. Some of the components of FIG. 1 may be provided outside of an integrated circuit or die.

The device 1 comprises a number of traffic initiators (also known as a master or source) 2 which are configured to communicate with various targets (or destinations) 10 and vice versa. The initiators may be any suitable device and by way of example may be one or more of a CPU (computer processor unit), transport stream processor, decoder, graphics processor, encoder, video display processor and graphics processor. It should be appreciated that these units are by way of example only and any other alternative or additional traffic initiator may be used. In the example shown in FIG. 1, there are three initiators. However, it should be appreciated that this is by way of example only and more or less than three initiators may be provided.

By way of example only, the targets may comprise one or more of a flash memory, a peripheral component interconnect (PCI), a double data rate memory (DDR) and an eRAM (embedded random access memory). It should be appreciated that these targets are by way of example only and any other suitable target may alternatively or additionally be used. More or fewer than the number of targets shown may be provided in other embodiments. In the example shown in FIG. 1, three targets are shown. However, it should be appreciated that this is by way of example only and more or less than three targets may be provided.

The various initiators and targets are able to communicate via a network on chip NoC 12. The NoC 12 comprises a respective network interface 4 for each of the respective initiators 2. In some embodiments, two or more initiators may share an interface. In some embodiments, more than one interface may be provided for a respective initiator. Likewise, an interface 14 is provided for each of the respective targets. In some embodiments two or more interfaces may be provided for a respective target. In some embodiments two or more targets may share the same interface.

The network interfaces 4, 14 are connected to one or more routers 8 via links 6. The routers are connected to each other via links 6. The network on chip shown in FIG. 1 is simplified and shows three routers. In practice, the network on chip may comprise many more than three routers. The topology may be regular, custom or any other suitable topology.

Some embodiments may have an on-chip interconnection which may be organized as a packet-based source routing and switching network-on-chip.

A CPU (computer processing unit) 13 is provided which is coupled to each of the network interfaces. The CPU is configured to control the programming of the network interfaces as will be described in more detail later.

Embodiments may be used in a wide range of applications. Some embodiments may be used in graphics and/or video applications. These applications may demand a relatively high bandwidth and relatively large memory buffers.

Some applications may require two or more double data rate memories (DDR) memory controllers. In other words two or more channels may be required. Some applications may have security engines provided close to a memory for encryption and may for example use address-based filtering.

In some embodiments one or more NoC features, also known as NoC services are programmable at run-time or boot by software. Examples of NoC services are quality of service (QoS), routing, security, address interleaving and the like.

Network on chip reprogramming points are distributed and are provided in service access points which in some embodiments may be network interfaces.

In some embodiments, SoC (system on chip) platforms may be multipurpose platforms. For example, the same SoC may be used in several contexts and/or markets and/or with different customers. In some embodiments, the same SoC may be used to run several multimedia applications (music, video, images), browse the internet, connect with other devices and/or the like. The SoC platforms may be open platforms.

In some embodiments, the target application or use of the SoC may not always be known in advance.

In some embodiments, the SoC interconnect may be flexible and adaptable to cope with different system and/or application scenarios.

The SoC interconnect may be fixed at design time in terms of one or more of topology, maximum offered bandwidth, the number of network interfaces, and connectivity.

Some embodiments may provide the ability to re-program at run-time interconnect features on top of their fixed configuration. This may provide optimized performances to each targeted SoC market usage and/or application scenario.

Some embodiments may provide reprogramming of the actual device itself which may be in the form of an integrated circuit, a die or a block on an integrated circuit or die.

Some embodiments may provide reprogramming of the device when it is in the CAD (computer aided design) or similar phase. In other words, the device is not a physical device but is represented by computer software, computer code and/or the like.

Some embodiments may have distributed re-programming points and asynchronous updating of the re-programming points. In some embodiments, the registers of the same service in the different points may be updated but not at the same time.

Some services may require that all the updates should take effect with a global coherency.

Consider the following example: register 1 is updated at T1, register 2 is updated at T2 but the system can work only with both reg1=OLDvalue1 and reg2=OLDvalue2 OR reg1=NEWvalue1 and reg2=NEW_value2. Care should thus be taken that one register does not contain an old value while the other register contains a new value. These registers may be in different network interfaces.

In one approach, no system coherent hardware support is used. Registers in one network interface are updated but there is no hardware to ensure global coherency with other register points. Rather, for coherency of service, this is achieved with software control of the coherency. This means that the reprogramming software should be sure about the coherency conditions. However this approach may not be appropriate with complex open platforms. There may be a cost in software (SW) complexity and/or a cost in system efficiency.

Figure 2:
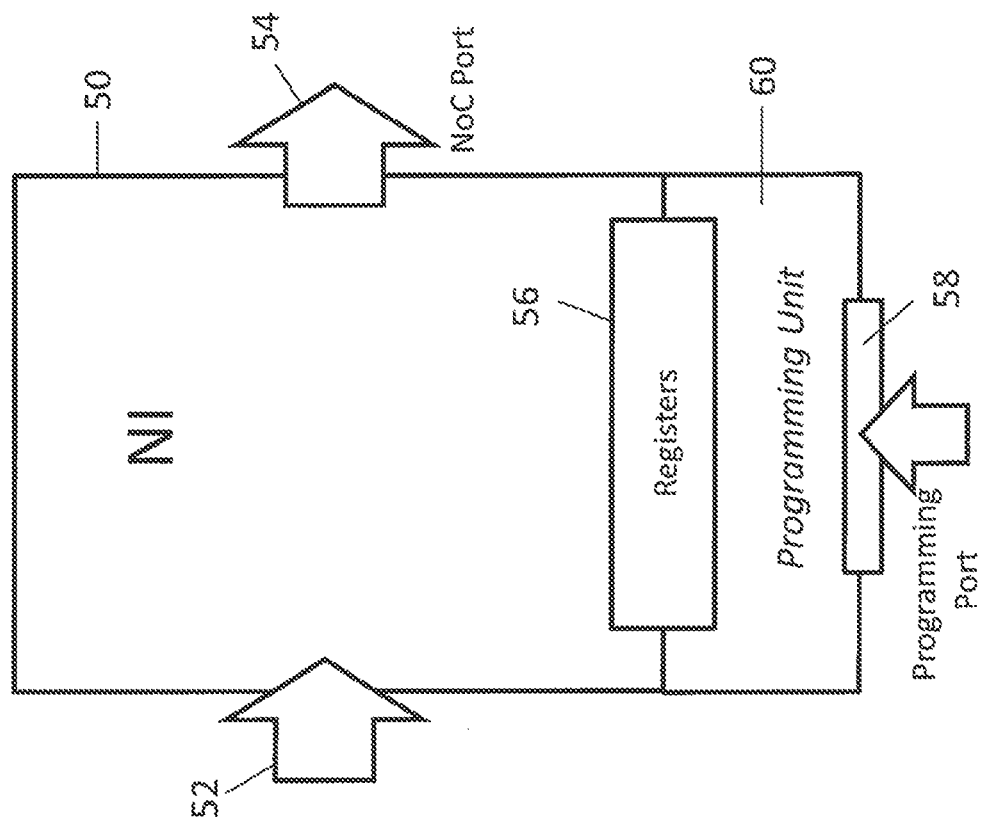
FIG. 2 shows a network interface.

Reference is made to FIG. 2 which shows a network interface in accordance with the above approach. The network interface comprises an input socket 52 from for example a source and an output port 54 to a NoC. The network interface comprises registers 56. The network interface has a programming unit 60 with a programming port 58.

In order to avoid coherency problems, the arrangement of FIG. 2 has to be controlled by the software to carry out the reprogramming at the right time with respect to the reprogramming of other network interfaces such that coherency problems are avoided.

Some embodiments may provide hardware support in each NoC network interface to ensure a global coherent reprogramming and may relax programming SW system requirements for system condition awareness e.g., traffic or context.

Some embodiments may allow the programming SW to stop/restart incoming traffic in different NoC distributed network interfaces. The network interfaces may be reprogrammed while the traffic is stopped. When the traffic restarts, all the relevant network interfaces may have been reprogrammed.

Some embodiments support one or more of the following re-programming schemes: non coherent; coherent without additional control; coherent with flushing of request FIFO (first in first out buffer); and coherent with completion of outstanding transactions.

One or more of the following may be re-programmable interconnect features: QoS; address interleaving QoS; routing; security; address interleaving on/off; address interleaving start/end; address interleaving step; bandwidth; and destination. One or more of these features may be controlled by programming and/or values provided in memory such as registers.

A network interface device may exhibit a programming port if that device can be re-programmed.

A specific register, sometimes referred to as the last register of the programming port indicates if the NI is available for a re-programming sequence or not. The reprogrammable features may have dedicated registers in the NI at network boundaries.

Only registers matching a re-programmable feature may be implemented in each network interface, in some embodiments.

Figure 3:
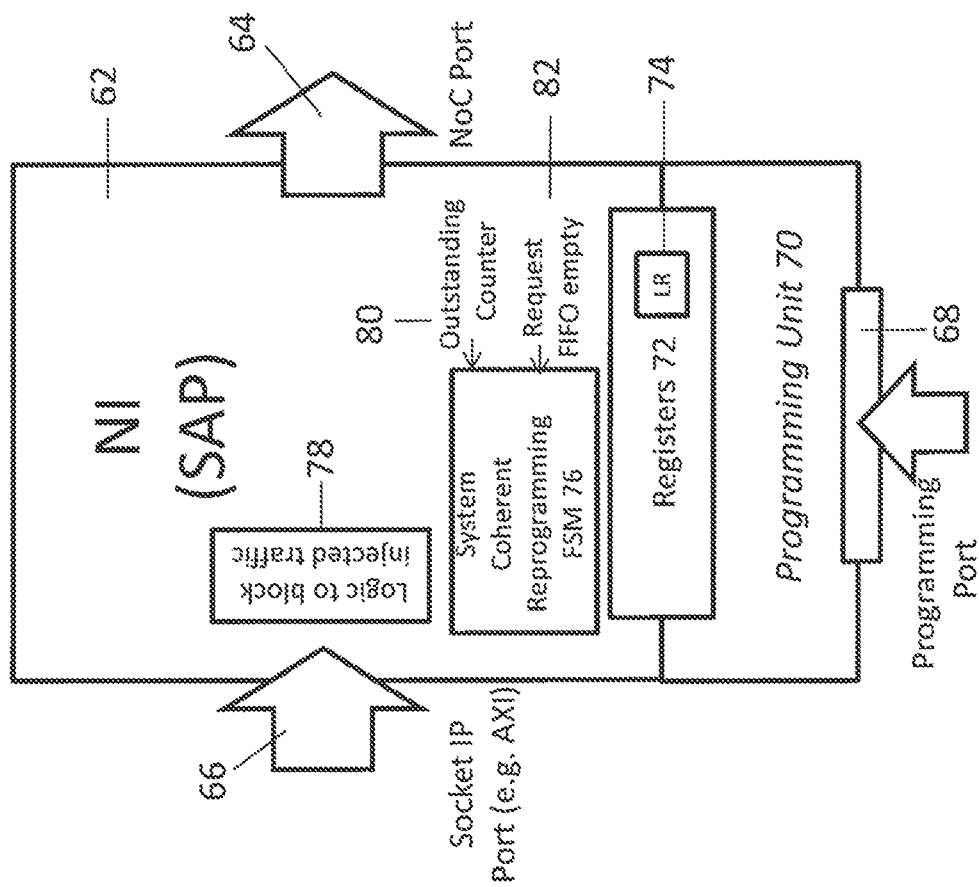
FIG. 3 shows a second network interface.

Reference is made to FIG. 3 which shows another network interface. The network interface 62 has an input socket 66 for the source and an output socket 64 to the NoC port. The network interface registers 74 have per-service registers and the system coherent reprogramming local reprogramming LR register 74.

The network interface also has some logic. In some embodiments, this may be in the form of a finite state machine FSM 76 which manages the signals driving the traffic blocking and re-starting of the traffic. The FSM may also control the update of the registers. The FSM controls when to apply the new programmed values to the effective per-service registers. As will be described in more detail, the FSM also controls the update of the LR register. Also provided is logic 78 to block injected traffic. This logic 78 manages the traffic blocking and re-starting of the traffic in conjunction with the FSM. The FSM also counts outstanding transactions (e.g., transactions for which a response has not been received), gets FIFO request status (a request received from a source is put into a FIFO and then output to the NoC from the FIFO) and other control signals needed by the FSM. The FSM and the logic to block the injected traffic may be provided by a single function. The outstanding transactions may be counted by an outstanding counter 80 which provides an output to the FSM. The FIFO 82 may provide information on the status of the FIFO to the FSM, for example indication if the FIFO is empty or if the FIFO still contains requests.

The network interface has a programming port 68 via which the CPU provides data to or reads data from the network interface. The programming port 68 provides access to a programming unit 70. The programming unit may write data to one or more of the registers 72 used for storing reprogramming data before that data is used. These registers are sometimes referred to as programming registers. The reprogramming data will then be written to the registers 72 which are used in operation when the reprogramming is to take place. These operational registers are sometimes referred to as shadow or internal registers. In this way the reprogramming data may be received in advance by the network interface but only written to the operational registers 72 at an appropriate time. The operational registers can thus be continued to be used until such time that those registers are reprogrammed. It should be appreciated that in the embodiment shown, a dedicated programming port 68 is provided by which the CPU 13 can access the respective network interfaces. The CPU 13 may access that port 68 via dedicated links or via the network on chip.

It should be appreciated that in some embodiments, a network interface may be in a different clock domain to one or more other network interfaces.

Figure 4:
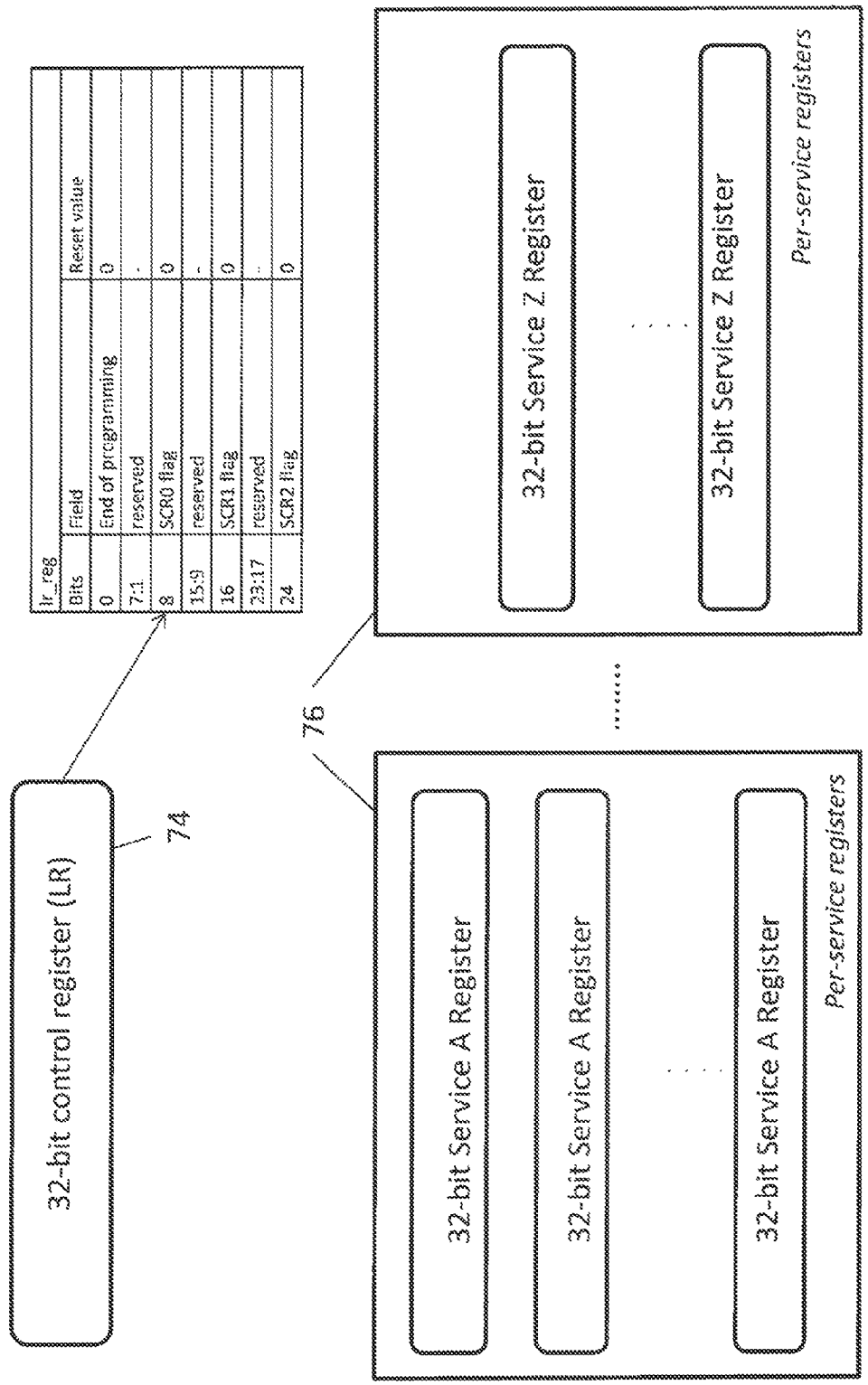
FIG. 4 schematically shows the registers of the network interface of FIG. 3 in more detail.

Reference is made to FIG. 4 which shows schematically the registers of a network interface. It should be appreciated that the CPU may be configured to read the registers of the network interface and/or write to the registers of the network interface.

As is schematically shown, the registers may comprise a set of registers for each service provided by the network interface. A set of registers for a particular service may comprise one or more registers. By way of example only, a service may be associated with a particular destination for any request. However, it should be appreciated that any other suitable type of service may be supported.

One or more of the registers for a service may be updated. For example, if the first service, service A, is to be reprogrammed, one or more of the group of registers for that service may be updated. It should be appreciated that in some embodiments, one, only some or all of the services may be reprogrammed in a reprogramming operation.

In some embodiments, a common flag may be used regardless of the service being updated. In other embodiments different flags may be used for different services.

A control register LR 74 is provided. The control register has an end of programming bit which has one value when the programming has been completed and a different value while programming is taking place. For example, when the end of programming has been completed or when there is no reprogramming being carried out, the value will be 0 and while the programming is being performed, the bit will have the value 1.

The control register will have at least one SCR (system coherent reprogramming) flag. In the embodiment shown in FIG. 4, three SCR flags are provided. However, this by way of example only and in other embodiments, a single SCR flag may be used or a plurality of SCR flags. The flag has one value when asserted during reprogramming and the other value when not asserted. In some embodiments, the value of the flag when asserted may be 1.

The first flag is SCR0. This is used where there is no NI event awaited. This may be used if the only way to re-start traffic is based on external software SW access of the NI to reset the flag SCR0.

The second flag is SCR1. This is used where the condition to re-start the traffic is external SW access (reset of SCR1) and an internal NI event. The NI event can be any suitable event such that the transactions tagged with old service registers values are flushed in the FIFO which injects packet into the NoC.

The third flag is SCR2. This is used where the condition to re-start the traffic is external SW access (reset of SCR2) and an internal NI event. The NI event may be any suitable event and will be a different event to that which is used in relation to the second flag. For example, the network event may be that the transactions tagged with old service registers values are consumed by the network and relevant responses are back, with no responses outstanding.

The modes defined by the flags may be dependent on how strong coherency has to be with respect to a specific service and/or how fast restarting of traffic is to be. For example, for some services a mix of old and new service configuration packets in the networks may not be a problem, while for other services all the old packets have to be flushed before the traffic is restarted.

In the embodiment shown in FIG. 4, each of the registers is a 32 bit register. However, it should be appreciated that this is by way of example and another embodiments, different sized registers may be used.

Figure 5:
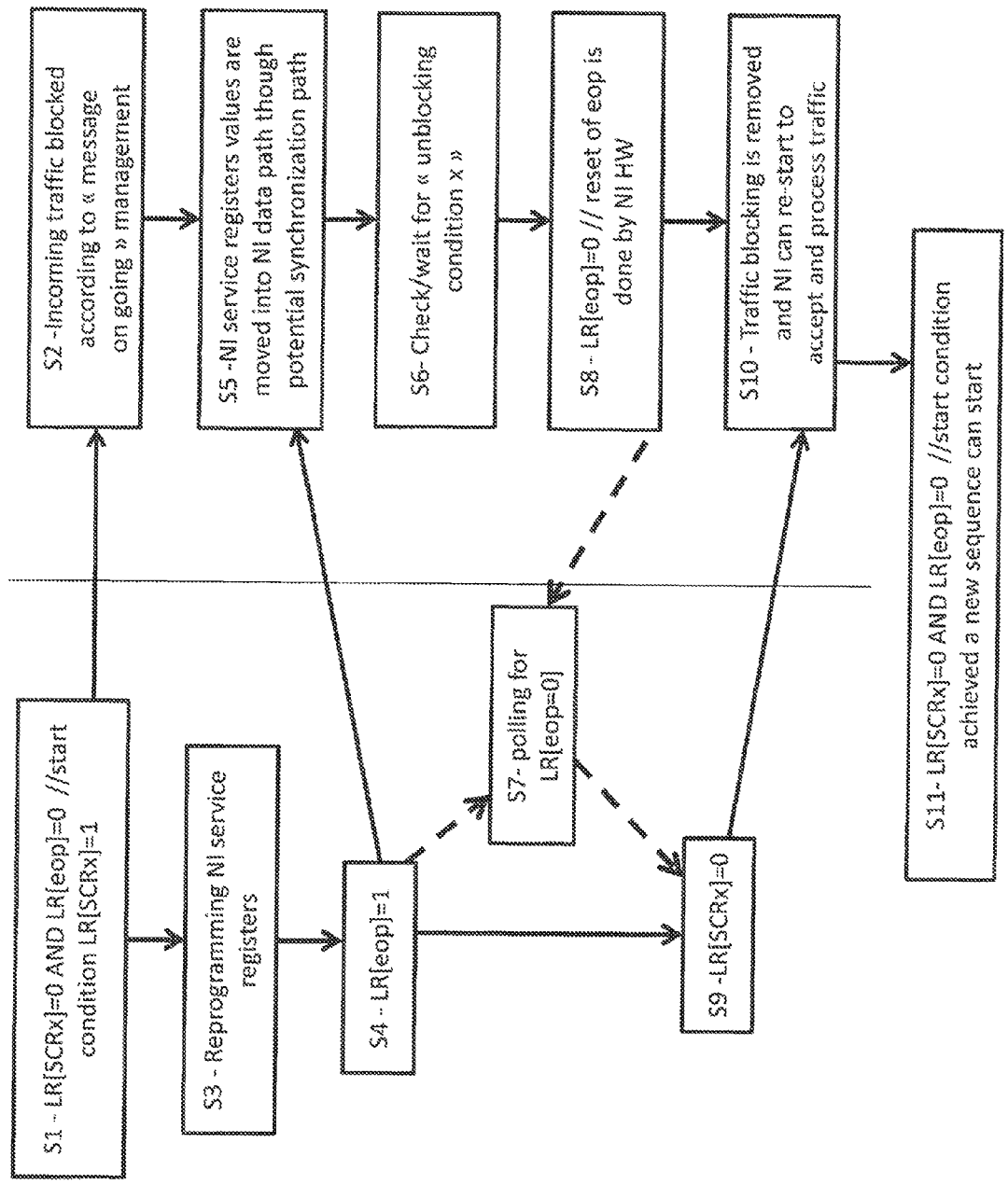
FIG. 5 shows a method of an embodiment.

A method of an embodiment will now be described with reference to FIG. 5. It should be appreciated that the steps shown on the left-hand side of the method flow comprise software steps which are controlled by the CPU 13 while the steps shown on the right side represent hardware steps implemented by the NI logic (That is by one or more of the FSM 76, logic block 78, outstanding counter 80, FIFO 82 of FIG. 3).

In step S1, the SCR flag being considered has a value of 0 and is not asserted. The end of programming flag LR is set to 0. This provides the initial start conditions. When the value of the SCR flag being considered is changed to 1 by the software, the next step will be in the hardware.

In step S2, the incoming traffic is blocked. This is blocked by, for example, the logic which blocks the injected traffic. This means that the traffic from the source, which is provided to the input of network interface, is stopped. For example, a protocol used between the source of the traffic and the network interface may be a request/grant type protocol. In other words, the source will make a request and the network interface will grant or deny that request. If the request is granted, then the source will provide the traffic associated with the request to network interface. If the network interface rejects the requests, then no traffic is provided to the network interface. Accordingly, in some embodiments, the network interface may block the traffic by denying requests from the source. It should be appreciated that this is by way of example only, and any other suitable method for block incoming traffic from the source may be used. In step S3, on the software side, the programming registers will be updated by the CPU 13.

When the programming registers have been updated, in step S4, on the software side, the control register 74 is updated to set the end of programming value to 1.

In step S5, responsive to the end of programming value changing to 1, the programming register values are moved into the shadow registers.

In step S6, a check is made or the hardware waits for the occurrence of an un-blocking condition.

In this step S7, there may be polling of the register by the CPU to determine if the end of programming condition has been set to 0. This may be responsive to the end of programming bit having been set to 1.

The end of programming bit is reset by the network interface hardware in step S8 when the shadow registers are updated. The bit is set to 0.

In step S9, the SCR flag is reset by the CPU. This will be in response to the determination that the end of programming being reset. In response to that flag being reset, the traffic locking is removed by the hardware and the network interface can restart, accepting and processing traffic.

In step S11, as the SCR flag is zero and the end of program flag is zero, the start condition is achieved such that a new programming sequence can start.

In the following, examples are given of usage of the specific SCR flags. These usages are generally in line with the flow of FIG. 5.

SCR0 flow with Local Coherent Restart

The system SW checks the NI end of programming flag and SCR flags via the programming port. If LR=0 and all the SCR flags are 0, programming can start.

The system SW asserts the SCR0 flag through programming port. The input traffic is blocked. If a transaction is being transmitted by the NI, the traffic is blocked after the transmission of this transaction is completed.

The system SW writes the NI programming registers through the programming port.

The system SW writes the LR flag to 1. As soon as traffic is stopped, the NI transfers the programming registers to its internal/shadow registers and resets the LR flag The system SW de-asserts the SCR0 flag through programming port.

When NI has SCR0=0 and LR=0, it unblocks the input traffic. A new reprogramming sequence can be accepted on the programming port.

SCR0 Flow with Global Coherent Restart

The system SW checks the NI programming flags through programming port. If LR=0 and all the SCR flags are equal to 0, programming can start.

The system SW asserts the SCR0 flag through the programming port, blocking input traffic If a transaction is being transmitted by the NI, the traffic is blocked after the transmission of the transaction is completed.

The system SW writes the NI SAP programming registers through the programming port.

The system SW writes the LR (end of program) flag to 1. As soon as traffic is stopped, the NI transfers the programming registers to its internal/shadow registers and resets the LR flag to 0.

The system software waits for LR flag reset by NI and then de-asserts the SCR0 flag through the programming port. This allows the software to synchronize with one or more other NIs and force traffic re-start only after this system synchronization. The software may thus wait until the LR flag has been reset in two or more NIs before the SCR0 flag is de-asserted.

When the NI device has SCR0=0 and LR=0, the input traffic is unblocked and a new reprogramming sequence can be accepted on the programming port.

SCR1 Flow with Local Coherent Restart

The system SW checks the NI programming flags through the programming port. If LR=0 and all the SCR flags are 0, programming can start.

The system SW asserts the SCR1 flag through the programming port, blocking the input traffic.

If a transaction is being transmitted by the NI, the traffic is blocked after the transmission of the transaction is completed.

The system SW writes the NI programming registers through programming port.

The system software writes the LR flag to 1. As soon as traffic is stopped, the NI transfers the programming registers to its internal/shadow registers. When request header FIFO is flushed (and hence all transactions in the FIFO in the NI have been put onto the NoC), and the shadow registers are updated, the NI resets LR flag.

The system software de-asserts the SCR1 flag through the programming port.

When the NI has SCR1=0 and LR=0, the NI unblocks the input traffic. A new reprogramming sequence can be accepted on the programming port.

SCR1 Flow with Global Coherent Restart

The system SW checks the NI programming flags through the programming port. If LR=0 and all the SCR flags are equal to 0, programming can start.

The system asserts the SCR1 flag through the programming port, blocking the input traffic. If a transaction is being transmitted by the NI, the traffic is blocked after this transmission completes.

The system writes the NI programming registers through the programming port.

The system writes the LR flag to 1. As soon as the traffic is stopped, the NI transfers the programming registers to its internal/shadow registers.

When the request header FIFO is flushed, and the shadow registers are updated, the NI resets the LR flag.

The system waits for LR flag reset by NI and then de-asserts the SCR1 flag through programming port. This allows the system to synchronize with one or more NIs and force traffic re-start only this system synchronization.

When the NI has SCR1=0 and LR=0, the NI unblocks IP input traffic. A new reprogramming sequence can be accepted on the programming port.

SCR2 Flow with Local Coherent Restart

The system SW checks the NI programming flags through the programming port. If LR=0 and all the SCR flags are 0, programming can start.

The system SW asserts the SCR2 flag through the programming port, blocking the input traffic.

If a transaction is being transmitted by the NI, the traffic is blocked after the transmission of the transaction is completed.

The system SW writes the NI programming registers through programming port.

The system software writes the LR flag to 1. As soon as traffic is stopped, the NI transfers the programming registers to its internal/shadow registers. When all outstanding transactions have completed (i.e., responses to the transactions have been received) and the shadow registers are updated, the NI resets LR flag.

The system software de-asserts the SCR2 flag through programming port.

When the NI has SCRw=0 and LR=0, the NI unblocks the input traffic. A new reprogramming sequence can be accepted on the programming port.

SCR2 Flow with Global Coherent Restart

The system SW checks the NI programming flags through the programming port. If LR=0 and all the SCR flags are equal to 0, programming can start.

The system asserts the SCR2 flag through the programming port, blocking the input traffic. If a transaction is being transmitted by the NI, the traffic is blocked after this transmission completes.

The system writes the NI programming registers through the programming port.

The system writes the LR flag to 1. As soon as the traffic is stopped, the NI transfers the programming registers to its internal/shadow registers. When all outstanding transactions have completed (i.e., responses to the transactions have been received) and the shadow registers are updated, the NI resets LR flag.

The system waits for LR flag reset by NI and then de-asserts the SCR2 flag through programming port. This allows the system to synchronize with one or more NIs and force traffic re-start only this system synchronization.

When the NI has SCR2=0 and LR=0, the NI unblocks IP input traffic. A new reprogramming sequence can be accepted on the programming port.

It should be appreciated that the input port may support any suitable protocol which may be a standardized protocol or a proprietary protocol. For example the protocol may be AXI (advanced extensible interface).

The above embodiments have referred to various flags and states as being indicated by a 1 or 0. It should be appreciated that in alternative embodiments the value of any one or more flags or states can selected to have the opposite value to that described.

Embodiments have been described as using registers. It should be appreciated that any other suitable data storage may alternatively or additionally be used.

The above described embodiments have been described in relation to a network interface to a NoC. However, other embodiments may be used in the context of any other suitable access point.

Some embodiments may be applied in any other suitable scenario having a plurality of different register points. For example, the embodiments may be applied in a system on chip.

Some embodiments may have application where a plurality of registers are used to configure a functionality and such registers are distributed in different blocks or accessible through different programming ports.

Embodiments may be applied in a wide range of technologies and applications. For example, embodiments may be used in a set top box, a Digital Television (DTV), and an application processor in a multimedia convergence application. Embodiments may be used in communications devices such as mobile phones, smart phones or the like.

Some embodiments may be implemented by computer software. One or more of the steps of FIG. 5 may be performed by one or more computer executable instructions.

The method may be performed in a CAD tool as part of a circuit design process.

While this detailed description has set forth some embodiments of the present invention, the appending claims cover other embodiments of the present invention which differ from the described embodiments according to various modifications and improvements. Other applications and configurations may be apparent to the person skilled in the art.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   setting a first indicator to a first value, the first indicator including at least one of a transmitted request to stop traffic, a transmitted denial to start traffic, an ignored transmitted request to start traffic, and a first memory storage location;
   causing an apparatus to stop receiving traffic from a traffic source based on said setting the first indicator to the first value;
   accessing at least one register to read or write at least one new value;
   setting a second indicator to a second value to indicate that said act of accessing the at least one register has completed;
   setting said first indicator to a third value; and
   allowing said apparatus to receive traffic from said traffic source based on said first indicator having the third value and said second indicator having the second value.

2. A method as claimed in claim 1, wherein at least one of said first and second indicators includes a flag.

3. A method as claimed in claim 1, wherein said at least one register includes a control register.

4. A method as claimed in claim 1, comprising:
   providing a plurality of sets of registers, each set of registers associated with a service, said act of accessing the at least one register including the act of accessing at least one register of at least one set.

5. A method as claimed in claim 1, comprising:
   polling said second indicator to determine if said act of accessing the at least one register has completed.

6. A method as claimed in claim 1, wherein said act of setting the first indicator to the third value is dependent on a value of one or more further second indicators.

7. A method as claimed in claim 1, wherein said act of setting the first indicator to at least one value is by a controller.

8. A method as claimed in claim 1, wherein said act of setting the first indicator to at least one value is by a CPU.

9. A method as claimed in claim 1, comprising:
   providing a plurality of first indicators wherein said first indicator is one of the plurality of first indicators.

10. A method as claimed in claim 1, comprising:
    completing or flushing from a buffer each transaction associated with traffic received from the traffic source before said traffic was stopped, said completing or flushing being performed prior to the act of setting said first indicator to the third value.

11. An apparatus, comprising:
    an input configured to receive traffic from a traffic source;
    a first indicator, the first indicator including at least one of a transmitted request to stop traffic, a transmitted denial to start traffic, an ignored transmitted request to start traffic, and a first memory storage location;
    a second indicator;
    at least one register; and
    a controller configured to control said apparatus, said control including:
        setting said first indicator to a first value to cause said apparatus to stop receiving traffic from said traffic source;
        setting said second indicator to a second value to indicate that an access to read or write at least one new value of at least one of said at least one register has completed; and
        setting said first indicator to a third value;
    wherein when said second indicator has the second value and said first indicator has the third value, said controller is configured to allow said apparatus to receive traffic from said traffic source.

12. An apparatus as claimed in claim 11, wherein at least one of said first and second indicators includes a flag.

13. An apparatus as claimed in claim 11, wherein said at least one register includes a control register.

14. An apparatus as claimed in claim 11, comprising:
    a plurality of sets of registers, each set of registers associated with a service, said at least one register being a member of at least one set of registers of the plurality of sets of registers.

15. An apparatus as claimed in claim 11, comprising:
    an interface configured to receive a polling request for said second indicator to determine if said access of said at least one of said at least one register has completed, said interface further configured to provide a response to said polling request.

16. An apparatus as claimed in claim 15, wherein said interface is configured to receive said polling request from a second controller.

17. An apparatus as claimed in claim 11, comprising:
    an interface configured to receive information dependent on a value of one or more further second indicators, wherein setting said first indicator to the third value is dependent on said information.

18. An apparatus as claimed in claim 17, wherein said interface is configured to receive said information dependent on the value of one or more further second indicators from a second controller.

19. An apparatus as claimed in claim 16, wherein said second controller comprises a CPU.

20. An apparatus as claimed in claim 11, wherein said first indicator is one of a plurality of first indicators available to be set.

21. An apparatus as claimed in claim 11, comprising:
    a buffer, wherein control of said apparatus by said controller includes:
        completing or flushing from said buffer each transaction associated with traffic received from the traffic source before said traffic was stopped prior to setting said first indicator to the third value.

22. An integrated circuit, comprising:
    a traffic source;
    an interconnect; and
    a network interface, said network interface configured to receive traffic from said traffic source and output said traffic from said network interface onto said interconnect, said network interface including:
        a first indicator, the first indicator including at least one of a transmitted request to stop traffic, a transmitted denial to start traffic, an ignored transmitted request to start traffic, and a first memory storage location;
        at least one register; and
        a controller configured to control said integrated circuit, said control including:
            setting said first indicator to a first value to cause said network interface to stop receiving traffic from said traffic source;
            determining that an access to said at least one register has completed; and allowing said network interface to receive traffic from said traffic source based on said determining that the access to said at least one register is completed.

23. An integrated circuit as claimed in claim 22, comprising:
a programming interface;
a plurality of shadow registers coupled to the programming interface and configured to store reprogramming data to be written to the at least one register after said network interface stops receiving traffic from said traffic source.

24. An integrated circuit as claimed in claim 23, wherein said programming interface is arranged to pass reconfiguration data into the network interface, said reconfiguration data arranged to reprogram at least one feature of the network interface, said at least one feature drawn from a set of features including a quality of service feature, an address interleaving feature, a routing feature, a security address feature, an interleaving on/off feature, an address interleaving start/end feature, an address interleaving step feature, a bandwidth feature, and a destination feature.

25. An integrated circuit as claimed in claim 23, wherein said programming interface is arranged to pass reconfiguration data into the network interface, said reconfiguration data arranged to maintain coherency with a second network interface.

\* \* \* \* \*